US005509673A

United States Patent [19]

Wu et al.

[11] Patent Number: 5,509,673

[45] Date of Patent: Apr. 23, 1996

[54] ARMREST-DRIVEN WHEELCHAIR

[76] Inventors: Kung-Hsiung Wu; Hsiu-Fong Hsu, both of No. 294, Sec. 3, Hsing-Lung Rd., Taipei, Taiwan

[21] Appl. No.: 382,168

[22] Filed: Feb. 1, 1995

[51] Int. Cl.[6] .............................. A61G 5/02; B62M 1/04; B62M 1/14; B62M 1/16

[52] U.S. Cl. ........................ 280/250.1; 280/253; 280/255

[58] Field of Search ................................ 280/250.1, 236, 280/237, 238, 253, 255, 304.1

[56] References Cited

U.S. PATENT DOCUMENTS 4,453,729 6/1984 Lucken ................................ 280/250.1
4,762,332 8/1988 Seol .................................... 280/250.1
5,303,945 4/1994 Oxford .................................. 280/253

*Primary Examiner*—Mitchell J. Hill
*Attorney, Agent, or Firm*—Bacon & Thomas

[57] ABSTRACT

An armrest-driven wheelchair in which the armrests are pivoted to the wheelchair frame and turned turned back and forth about a respective pivot to rotate the wheels forwards or backwards by a respective transmission rod, which is driven by the respective armrest to connect a first bearing means, which is driven to turn the respective wheel forwards, or a second bearing means, which is driven to turn the respective wheel backwards, to the respective armrest.

7 Claims, 10 Drawing Sheets

ARMREST-DRIVEN WHEELCHAIR

BACKGROUND OF THE INVENTION

The present invention relates to wheelchairs, and relates more particularly to an armrest-driven wheelchair which is propelled to move forwards or backwards by turning two armrests back and forth.

Various motor-driven wheelchairs have been developed, and have appeared on the market. However, these motor-driven wheelchairs are still not popular for the disadvantage of complicated structure and expensive cost. U.S. Pat. No. 5,228,709, issued to Fong-Chung Kao, discloses a wheelchair driving mechanism, which includes a driving disk fastened to either large wheel of a wheelchair by a circular table and a circular casing for moving the wheelchair with the hand, and a ratchet wheel mechanism for permitting the respective large wheel to be rotated by the driving disk in one direction only. This structure of wheelchair driving mechanism is functional, however rotating the large wheels of the wheelchair by the driving disk is labor-consuming.

SUMMARY OF THE INVENTION

It is one object of the present invention to provide a wheelchair which is driven to move by the armrests so that the user's hands will not be contaminated by or jammed in the wheels when moving the wheelchair, it is another object of the present invention to provide a wheelchair which can be easily propelled forwards or backwards with less labor, it is still another object of the present invention to provide an armrest-driven wheelchair which eliminates the installation of push rims so that the width of the wheelchair is minimized for convenient movement in narrow spaces. It is still another object of the present invention to provide an armrest-driven wheelchair which is designed according to the law of biomechanics so that the wheelchair can be moved efficiently without causing an athletic injury, it is still another object of the present invention to provide an armrest-driven wheelchair which can be quickly stopped during the movement by lifting the armrests.

According to one aspect of the present invention, the armrests are respectively pivoted to the wheelchair frame and turned back and forth about a respective pivot to rotate the wheels forwards or backwards by a respective transmission rod, which is driven by the respective armrest to connect a first one-way bearing means, which is driven to turn the respective wheel forwards, or a second one-way bearing means, which is driven to turn the respective wheel backwards, to the respective armrest, according to another aspect of thee present invention, the armrests have a respective supporting frame, which can be turned between the collapsed position closely attached to the respective armrest and the operative position perpendicular to the respective armrest for supporting the respective armrest on the seat upholstery in horizontal for the resting of the hand. According to still another aspect of the present invention, each armrest has a rear end securely fixed with a brake block, which stops the respective wheel in position when the armrest is lifted to the upper limit position.

DETAILED DESCRIPTION OF THE PREFERRED EMBODIMENT

Figure 1:
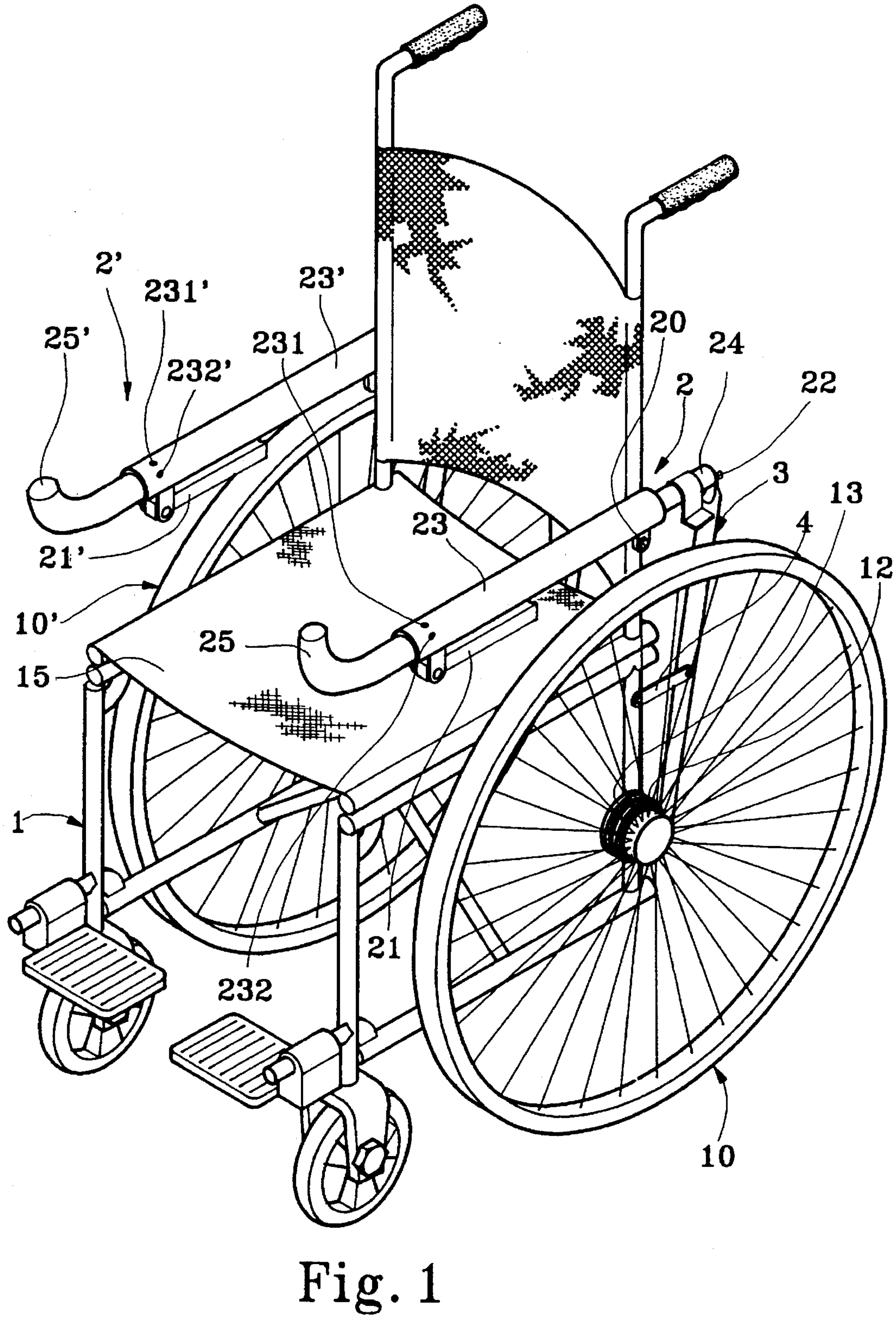
FIG. 1 an elevational view of a wheelchair according to one embodiment of the present invention.
Figure 3A:
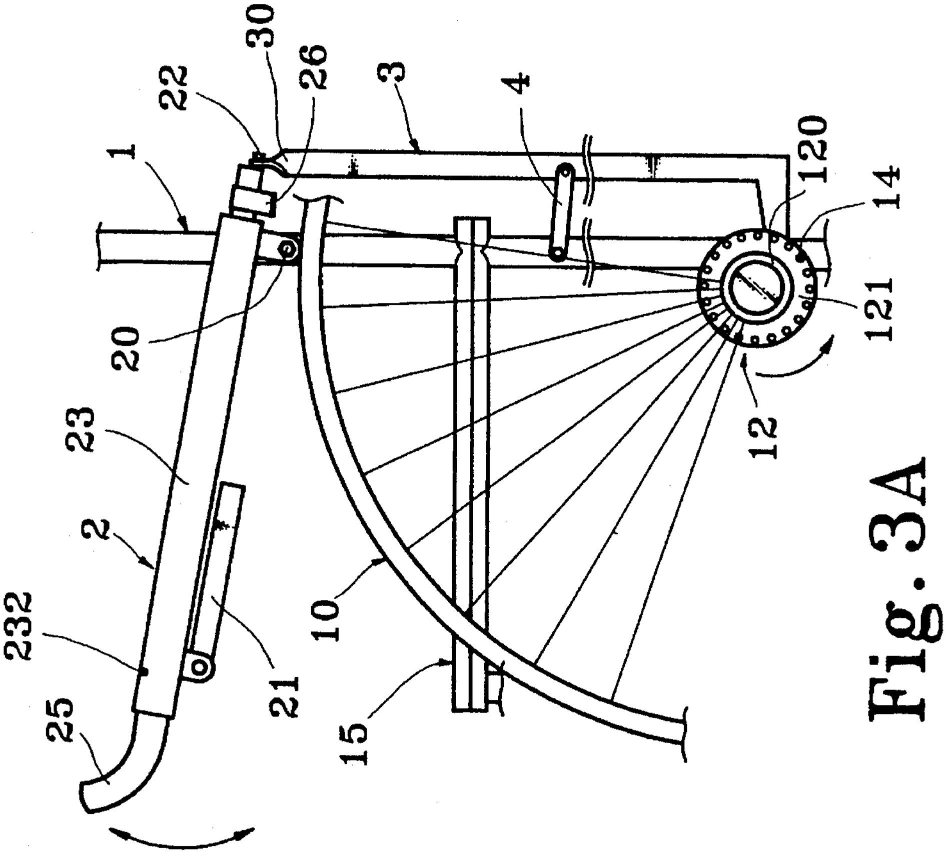
FIG. 3A is similar to FIG. 2 but showing the armrest lifted and the wheel turned.

Referring to FIG. 1, the wheelchair frame, referenced by 1, is supported on a pair of wheels 10 and 10', two separate armrests 2 and 2' are bilaterally pivoted to the wheelchair frame 1 for propelling the wheels 10 and 10' respectively. The armrests 2 and 2' are similar in structure, and therefore only one armrest 2 is described in detail. When the armrest 2 is alternatively turned back and forth about the pivot point 20 (see FIG. 3A) on the wheelchair frame 1, the wheel 10 is rotated.

Figure 2:
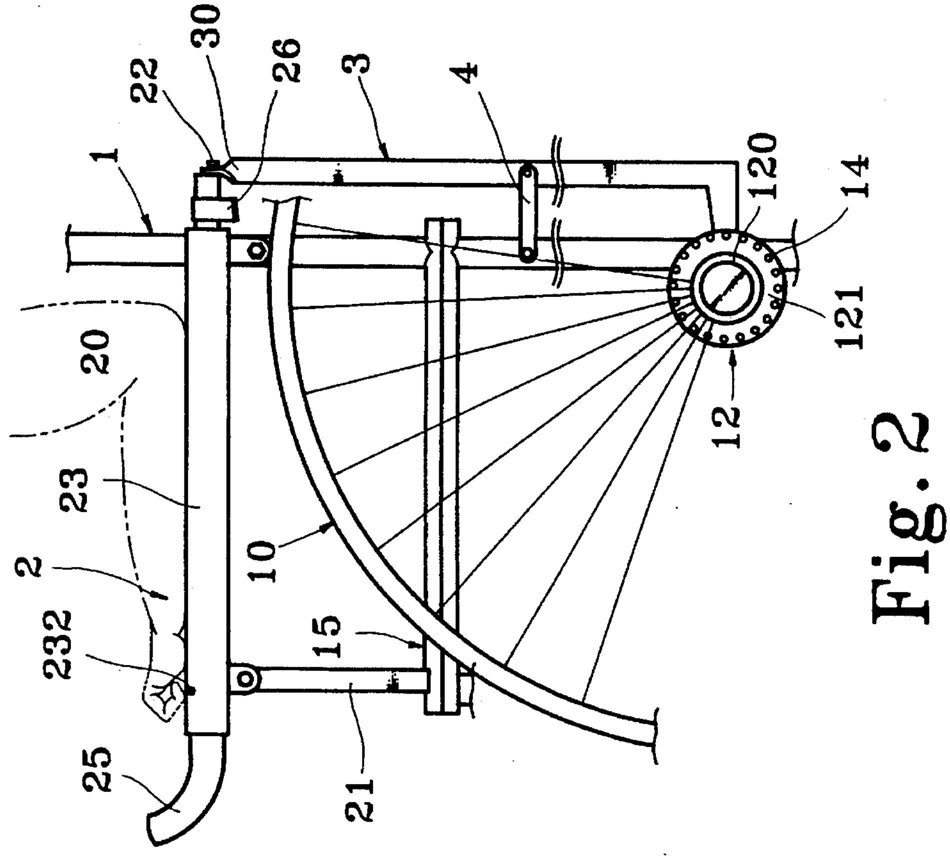
FIG. 2 is a partial view of the wheelchair shown in FIG. 1, showing the relative positions among the armrest, the transmission rod, and the bearing means.

Referring to FIG. 2 and FIG. 1 again, a first one-way bearing means 12 and a second one-way bearing means 13 are respectively mounted around the shaft 11 of the wheel 10. The one-way bearing means 12 and 13 can be one-way axle bearings, one-way gears, one-way ratchet wheels. Each bearing means 12 or 13 comprises a mounting device 120 or 130 fixedly mounted around the shaft 11, and a rotary device 121 or 131 turned around the mounting device 120 or 130 in one direction, the rotary devices 121 and 131 of the one-way bearing means 12 and 13 are set to be turned in reversed directions.

Figure 4A:
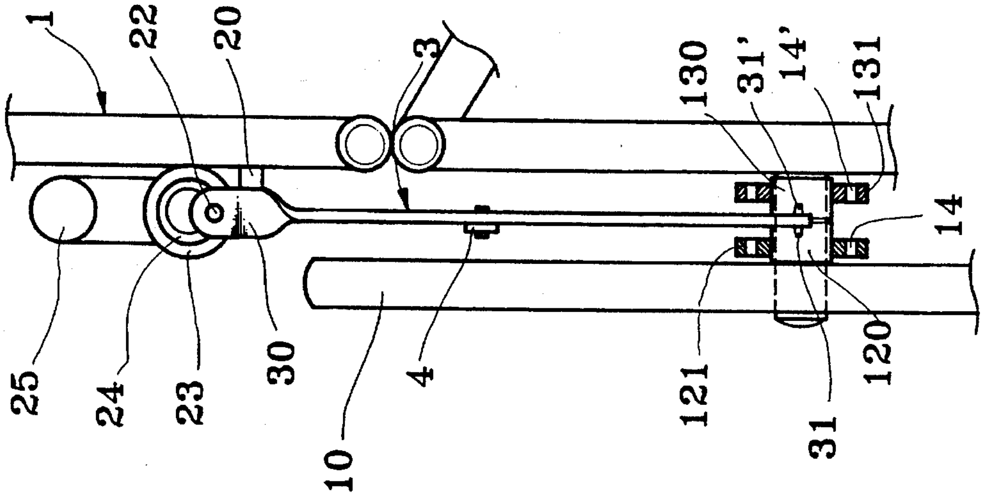
FIG. 4A is another partial view of the wheelchair shown in FIG. 1, showing the transmission rod disposed in the neutral position.
Figure 4C:
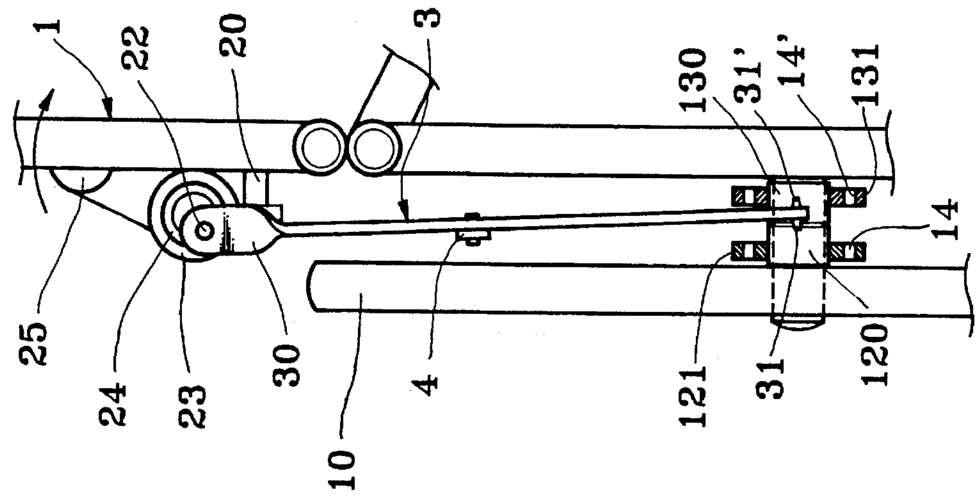
FIG. 4C is similar to FIG. 4A but showing the transmission rod moved to the second position with the second pin inserted into one through hole on the second bearing means.
Figure 4B:
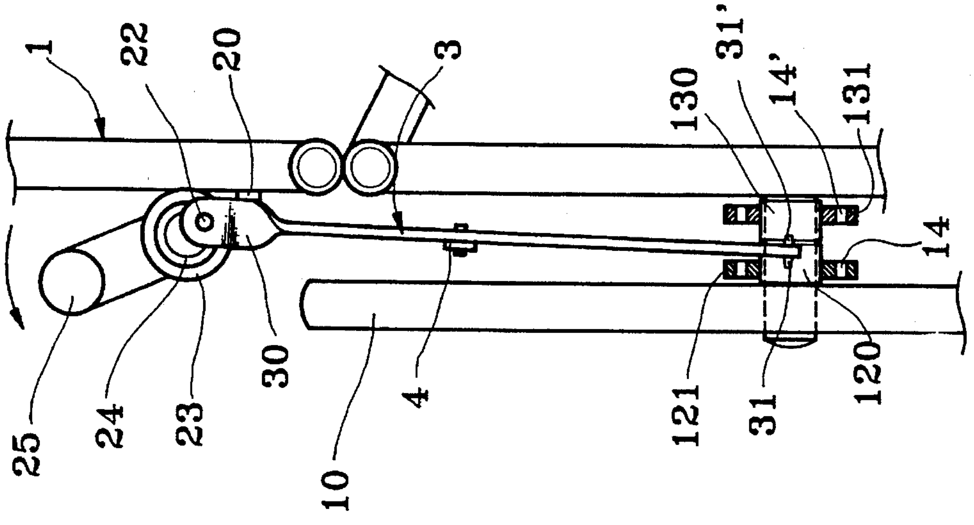
FIG. 4B is similar to FIG. 4A but showing the transmission rod moved to the first position with the first pin inserted into one through hole on the first bearing means.

The rotary devices 121 and 131 are spaced by a space for the positioning of a transmission rod 3, the transmission rod 3 has a first pin 31 and a second pin 31' bilaterally aligned at the bottom end thereof. The pin 31 or 31' can be inserted into any through hole 14 or 14' on the rotary devices 121 or 131 (see FIGS. 4A and 4B), or disconnected from the through holes 14 or 14' on the rotary device 121 or 131. The top end 30 of the transmission rod 3 is pivoted to the armrest 2, when the armrest 2 is turned back and forth, the transmission rod 3 is reciprocated vertically. If the first pin 31 is inserted into one through hole 14 on the rotary device 121

(see FIG. 4B), the wheel 10 will be turned forwards by the transmission rod 3 when the armrest 2 is turned back and forth; if the second pin 31' is inserted into one through hole 14' on the rotary device 131 (see FIG. 4C), the wheel 10 will be turned backwards by the transmission rod 3 when the armrest 2 is turned back and forth; if the first and second pins 31 and 31' are disconnected from the rotary devices 121 and 131 (see FIG. 4A), the wheel 10 can then be freely turned forwards or backwards by other people, the armrest 2 is pivotably attached with a supporting frame 21, which can be turned to a vertical position perpendicular to the armrest 2 for supporting the armrest 2 in a horizontal position above the seat upholstery 15 for the resting of the hand.

The top end 30 of the transmission rod 3 is turned about an eccentric pivot pin 22, which extends longitudinally from the rear end of the armrest 2. The middle part of the transmission rod 3 is pivotably connected with a link 4, which has an opposite end pivotably connected to the wheelchair frame 1. The link 4 keeps the transmission rod 3 disposed in the "neutral" position in which the pins 31 and 31' of the transmission rod 3 are disconnected from the rotary devices 121 and 131.

Figure 5A:
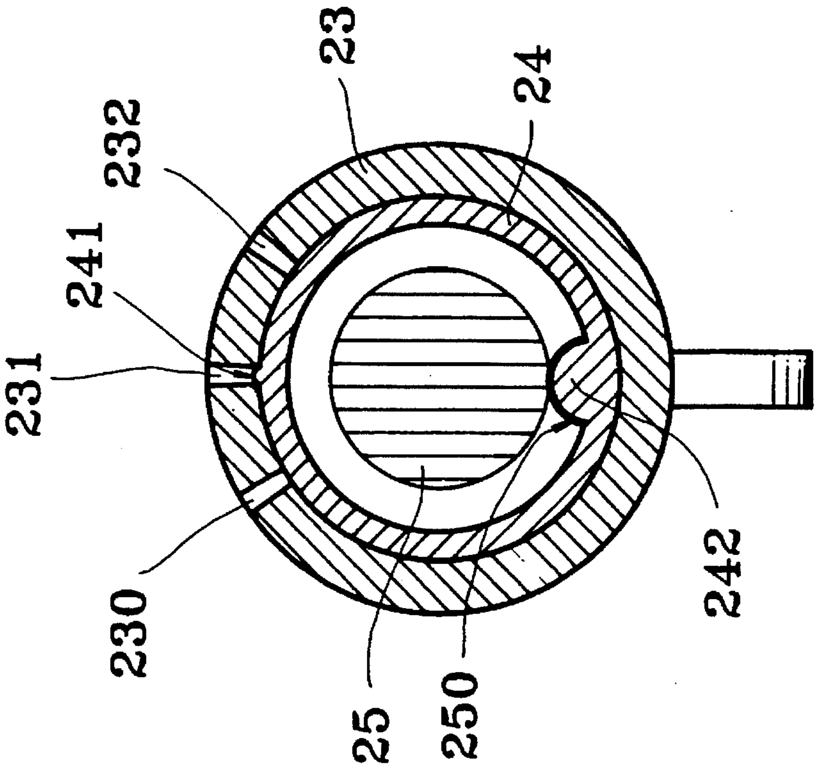
FIG. 5A is a transverse view in section of the armrest shown in FIG. 1.
Figure 5B:
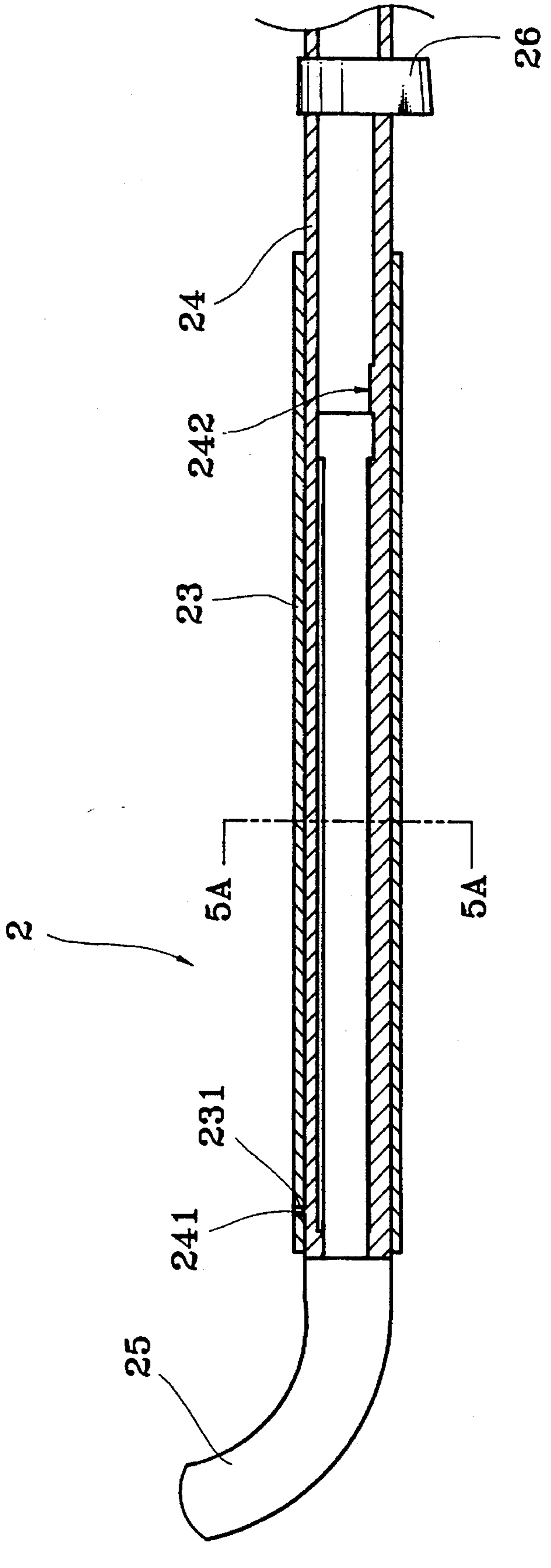
FIG. 5B is a longitudinal view in section of the armrest of the wheelchair shown in FIG. 1.

Referring to FIGS. 5A and 5B, the armrest 2 comprises a first tube 23 turned about the pivot point 20 on the wheelchair frame 1 and having three locating holes 230, 231 and 232 aligned around the periphery at one end, a second tube 24 inserted through the first tube 23 and having an outside projection 241 engaged into one locating hole 230, 231 or 232, and a third tube 25 coaxially installed in the second tube 24 and driven to turn the second tube 24. The aforesaid eccentric pivot pin 22is securely fixed to the rear end of the second tube 24. When the second tube 24 is turned within the first tube 23, the eccentric pivot pin 22 forces the transmission rod 3 leftward or rightward, causing the pin 31 or 31' to be inserted into one through hole 14 or 14' on the rotary device 121 or 131. Therefore, the revolving direction of the wheel 10 can be conveniently controlled by turning the second tube 24 within the first tube 23. The third tube 25 has a longitudinal groove 250. The second tube 24 has a longitudinal rib 242. When the third tube 25 is inserted into the second tube 24, the longitudinal rib 242 is engaged with the longitudinal groove 250, and therefore the third tube 25 can be moved longitudinally relative to the second tube 24 to adjust the combined length of the armrest 2, however the third tube 25 is prohibited from rotary motion relative to the second tube 24. When the third tube 25 is rotated, the second tube 24 is simultaneously turned in the same direction. Therefore, by turning the third tube 25 in either direction, the pin 31 or 31' of the transmission rod 3 is forced into one through hole 14 or 14' on the rotary device 121 or 131 of the bearing 12 or 13, permitting the wheel 10 to be turned forwards or backwards, the front end of the third tube 25 terminates in an upwards curved handgrip 25 for the holding of the hand comfortably.

Figure 3B:
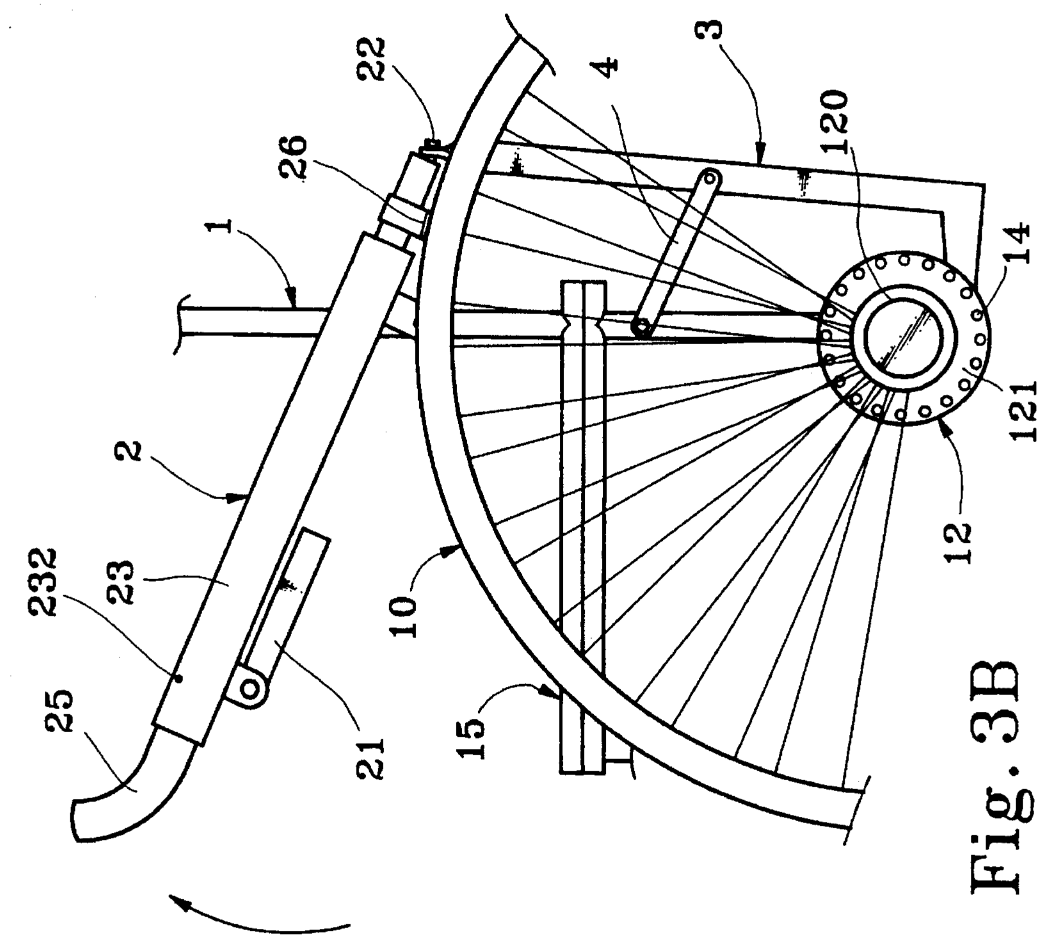
FIG. 3B is similar to FIG. 3 but showing the armrest lifted and the brake block stopped against the wheel.

The aforesaid second tube 24 is securely fixed with a brake block 26, which is disposed between the pivot point 20 and the eccentric pivot pin 22. When the armrest 2 is lifted to the upper limit (see FIG. 3B), the brake 26 is forced against the wheel 10 to stop the wheel 10 from moving. Therefore, if to change the moving direction of the wheelchair, the user can stop one wheel 10 or 10' and turn the other wheel 10' or 10. If to turn the wheelchair at the same point, the the wheels 10 and 10' are simultaneously turned in reversed directions.

Figure 6:
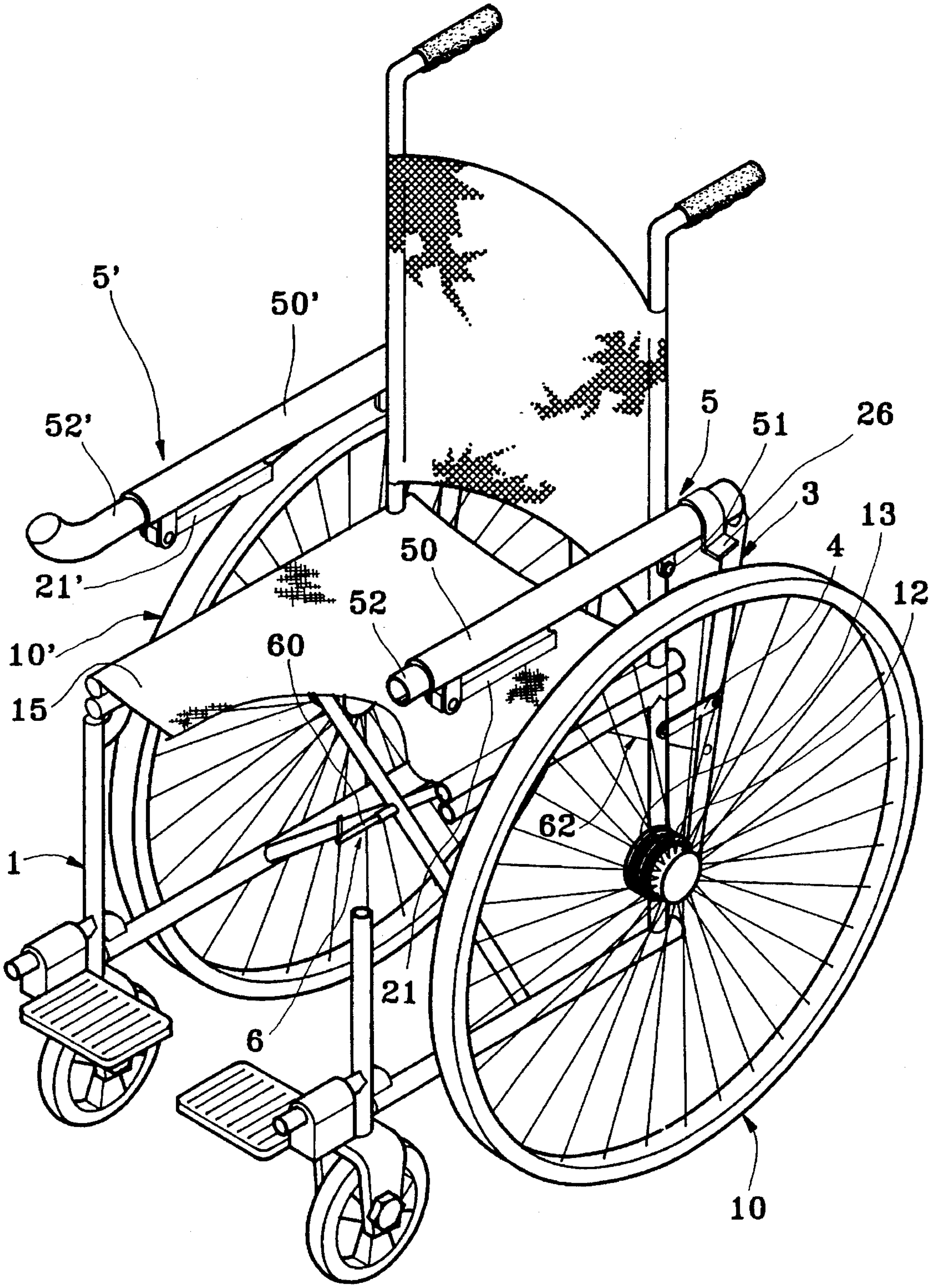
FIG. 6 is an elevational view of the alternate form of the wheelchair according to the present invention.
Figure 7A:
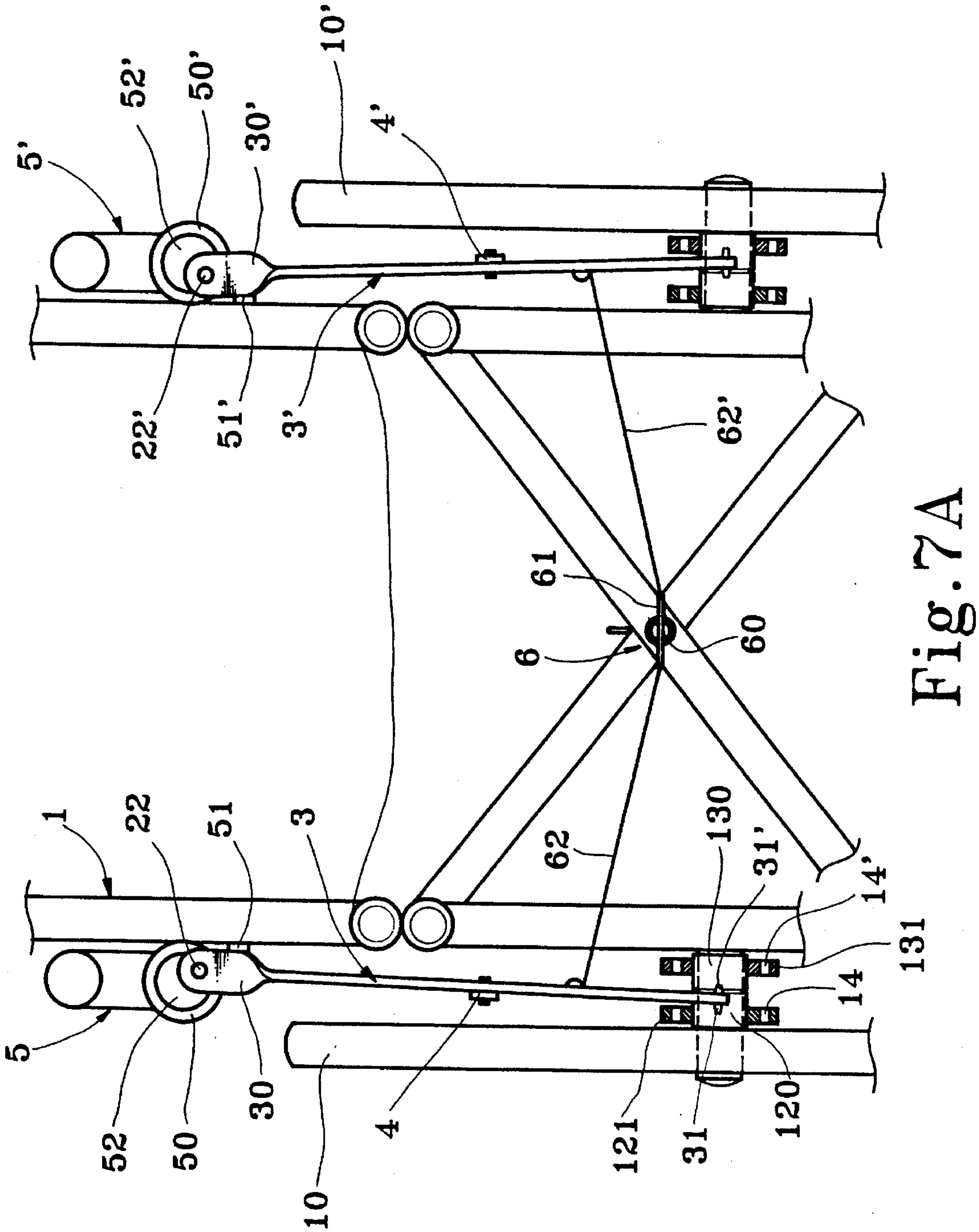
FIG. 7A is a partial plain view of the wheelchair shown in FIG. 6, showing the position of the manipulation device relative to the transmission shafts and the wheelchair frame.
Figure 7B:
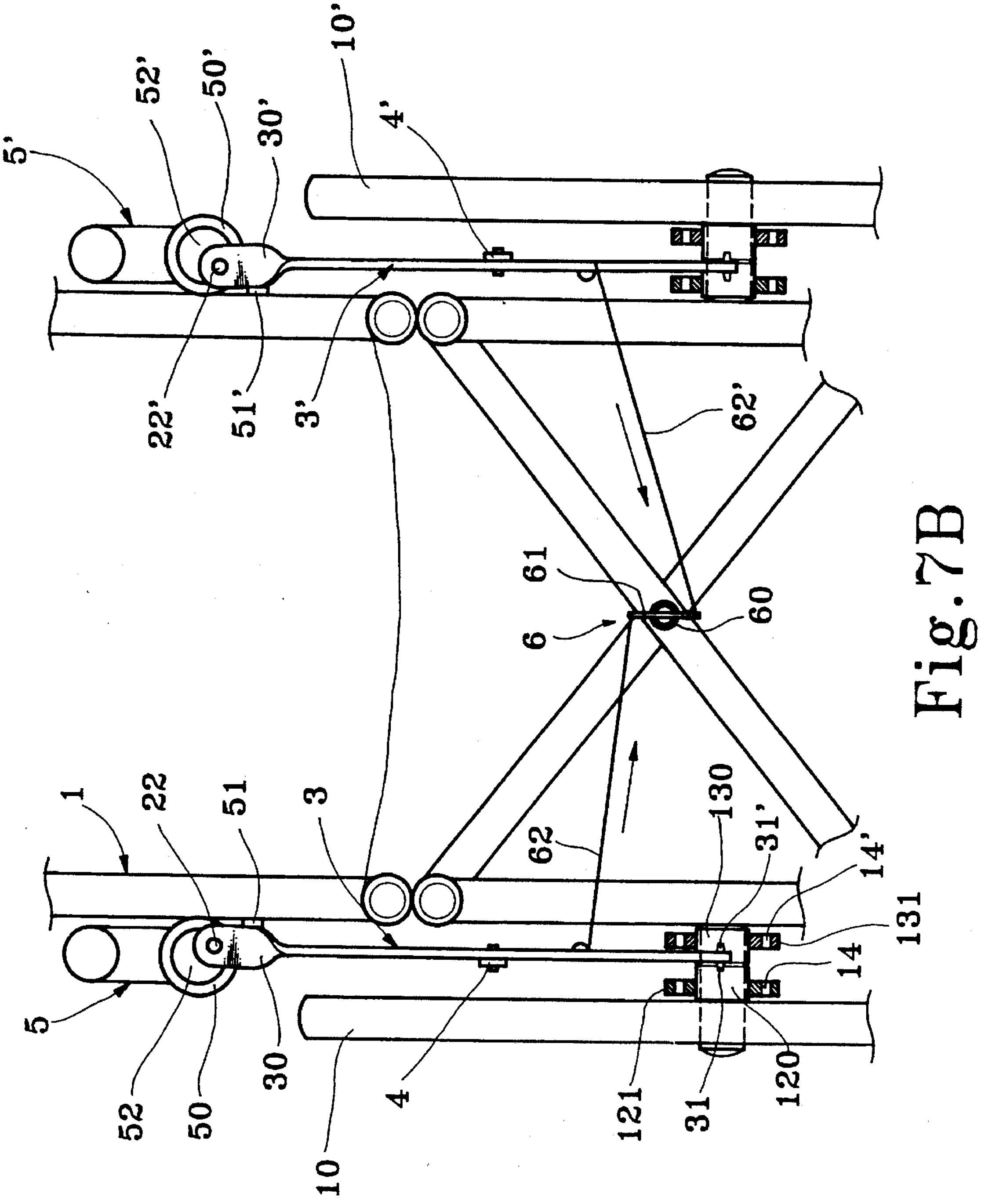
FIG. 7B is similar to FIG. 7A but showing the manipulation device operated.
Figure 8:
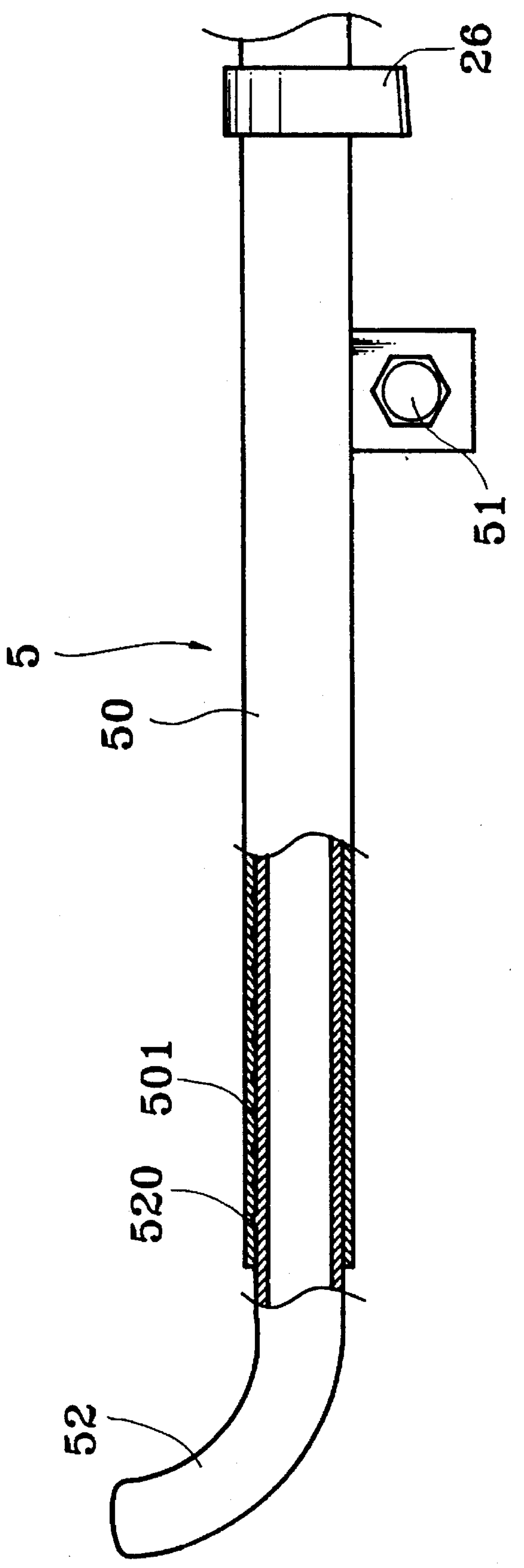
FIG. 8 is a longitudinal view in section of the armrest shown in FIG. 6.

FIGS. 6 and 8 show an alternate form of the present invention. This alternate form includes a manipulation device 6, and the structure of the armrest is also different. The armrest of this alternate form, referenced by 5, comprises a first tube 50 is pivoted to the wheelchair frame 1 and turned about a pivot point 51, and a second tube 52 inserted into the first tube 50. The second tube 52 has a longitudinal series of raised portions 520. The first tube 50 has a longitudinal series of recessed portions 501, which receive the raised portions 520 of the second tube 52, the first tube 50 has a rear end pivoted to the transmission rod 3, and a front end terminating in an upwards curved handgrip 52, The manipulation device 6 comprises an elongated swivel rod 60 mounted on the wheelchair frame 1 below the seat upholstery 15, a cross rod 61 perpendicularly connected to the swivel rod 60 at one end, and two pull ropes 62 and 62' respectively stretched between two opposite ends of the cross rod 61 and the transmission rods 3 and 3. When the user wishes to change the revolving direction of the wheels 10, as shown in FIG. 7B, the swivel rod 60 is turned to move the transmission rods 3 and 3', causing the pins 31 moved away from the through holes 14 on the rotary devices 121 of the first bearing means 12 and the pins 31' forced into the through holes 14' on the rotary devices 131 of the second bearing means 13, and therefore the wheels 10 and 10' can be turned backwards. On the contrary, if the swivel rod 60 is turned to its former position, the pins 31 are respectively forced into the through holes 14 on the rotary devices 121 of the first bearing means 12 by the elastic resilience of the material property of the transmission rods 3, and the wheels 10 and 10' can then be turned forwards.

It is to be understood that the drawings are designed for purposes of illustration only, and are not intended as definition of the limits and scope of the invention disclosed.

We claim:

1. An armrest-driven wheelchair of the type comprising a wheelchair frame, a seat upholstery carried on said wheelchair frame for sitting by an user, two separate wheels mounted on said wheelchair frame at two opposite sides and separately turned for moving said wheelchair frame, and two armrests mounted on said wheelchair frame at two opposite sides, wherein: two first bearing means are respectively mounted on the shaft of each wheel and driven to turn each wheel forwards; two second bearing means are respectively mounted on the shaft of each wheel and driven to turn each wheel backwards; said armrest are respectively pivoted to said wheelchair frame and turned back and forth about a respective pivot on said wheelchair frame to turn said wheels forwards or backwards; two transmission rods respectively coupled to said armrests and controlled by said armrests to connect said said first bearing means or said second bearing means to said armrests, permitting said wheels to be turned forwards or backwards by said armrests.

2. The armrest-driven wheelchair of claim 1 wherein said first bearing means and said second bearing means are one-way ratchet wheels.

3. The armrest-driven wheelchair of claim 1 wherein said first bearing means and said second bearing means are one-way bearings.

4. The armrest-driven wheelchair of claim 1 wherein said first and second bearing means each comprises a mounting device securely fixed to the wheel shaft of one wheel and a rotary device turned around the mounting device in one direction, said rotary device having a plurality of through holes around the wheel shaft of the respective wheel for the connection of the respective transmission rod, the rotary devices of said first bearing means and the rotary devices of said second bearing means being turned in reversed directions.

5. The armrest-driven wheelchair of claim 4 wherein each transmission rod has a top end pivoted to one armrest and a bottom end securely fixed with a first pin at one side and a second pin at an opposite side, and being moved by the respective armrest among a first position, in which said first pin is inserted in one through hole on the rotary device of the respective first bearing means for permitting the respective wheel to be turned forwards by the respective armrest, a second position, in which said second pin is inserted in one through hole on the rotary device of the respective second bearing means for permitting the respective wheel to be turned backwards by the respective armrest, and a third position, in which said first and second pins are disconnected from the rotary devices of the respective first and second bearing means.

6. The armrest-driven wheelchair of claim 5 wherein each armrest comprises a first tube turned about the respective pivot on said wheelchair frame, a second tube inserted through said first tube and turned relative to said first tube, and a third tube moved in and out of said second tube and turned to rotate said second tube within said first tube, said second tube having an eccentric pivot pin at a rear end thereof pivoted to one transmission rod and turned by said third tube to move the respective transmission rod among said first, second and third positions.

7. The armrest-driven wheelchair of claim 5 further comprising a manipulation device controlled to move said transmission rods among said first, second and third positions, said manipulation device comprising an elongated swivel rod mounted on said wheelchair frame and disposed below said seat upholstery, a cross rod perpendicularly fixed to said swivel rod at one end, and two pull ropes respectively stretched between said transmission rods and two opposite ends of said cross rod, said transmission rods being moved among said first, second and third positions when said swivel rod is driven to turn said cross rod.

* * * * *